United States Patent [19]

Kaarlela et al.

[11] 4,096,653
[45] Jun. 27, 1978

[54] CARTRIDGE RETAINING MEANS FOR EARTHWORKING TIPS

[75] Inventors: Willard Oswald Kaarlela; Eugene L. Helton, both of Peoria, Ill.

[73] Assignee: Caterpillar Tractor Co., Peoria, Ill.

[21] Appl. No.: 519,568

[22] Filed: Oct. 31, 1974

[51] Int. Cl.² .............................................. E02F 9/28
[52] U.S. Cl. .................... 37/142 A; 85/8.8; 85/50 R; 151/7; 403/318
[58] Field of Search ............ 37/141 T, 142 A, 142 R; 299/92; 403/372, 318, 224–226; 85/50 R, 8.8, 8.3, 32 R; 151/7; 85/8.6

[56] References Cited

U.S. PATENT DOCUMENTS

| | | | |
|---|---|---|---|
| 2,339,549 | 1/1944 | Kubaugh | 85/50 R |
| 2,477,430 | 7/1949 | Swanstrom | 151/7 |
| 2,723,699 | 11/1955 | Coates | 151/7 |
| 2,761,347 | 9/1956 | McKee, Jr. | 85/50 R X |
| 3,191,323 | 6/1965 | Compagnoni | 37/142 R |
| 3,216,475 | 11/1965 | Jacobsen | 85/32 R X |
| 3,358,569 | 12/1967 | Averette | 37/142 R X |
| 3,585,741 | 6/1971 | Heusler | 37/141 T |
| 3,601,203 | 8/1971 | Holmstrom | 37/142 R |
| 3,670,618 | 6/1972 | Jellison | 85/50 R X |
| 3,851,413 | 12/1974 | Lukavich | 37/142 R X |

FOREIGN PATENT DOCUMENTS

| | | | |
|---|---|---|---|
| 275,974 | 11/1969 | Austria | 85/50 R |
| 1,235,556 | 5/1960 | France | 85/50 R |
| 1,061,547 | 7/1959 | Germany | 85/8.8 |
| 1,308,037 | 2/1973 | United Kingdom | 37/142 A |

*Primary Examiner*—Edgar S. Burr
*Assistant Examiner*—Steven A. Bratlie
*Attorney, Agent, or Firm*—Phillips, Moore, Weissenberger, Lempio & Majestic

[57] ABSTRACT

An earthworking device comprises a support member having a work tool, such as an earthworking tip, detachably mounted on a forward end thereof. A pin is disposed in aligned bores formed through the support member and the work tool and an annular replaceable cartridge circumvents the pin to retain it in position. The cartridge comprises a housing having an annular elastomeric member secured therein and circumventing the pin in frictional engagement therewith.

12 Claims, 6 Drawing Figures

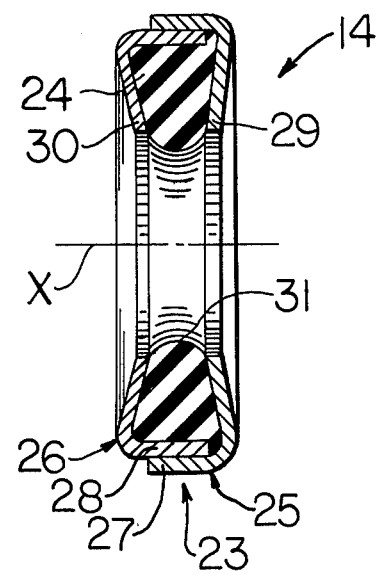
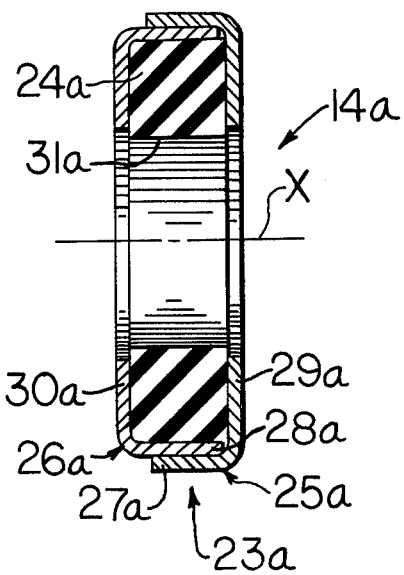
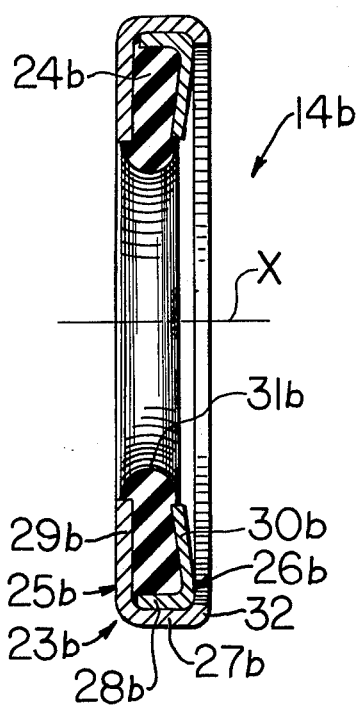
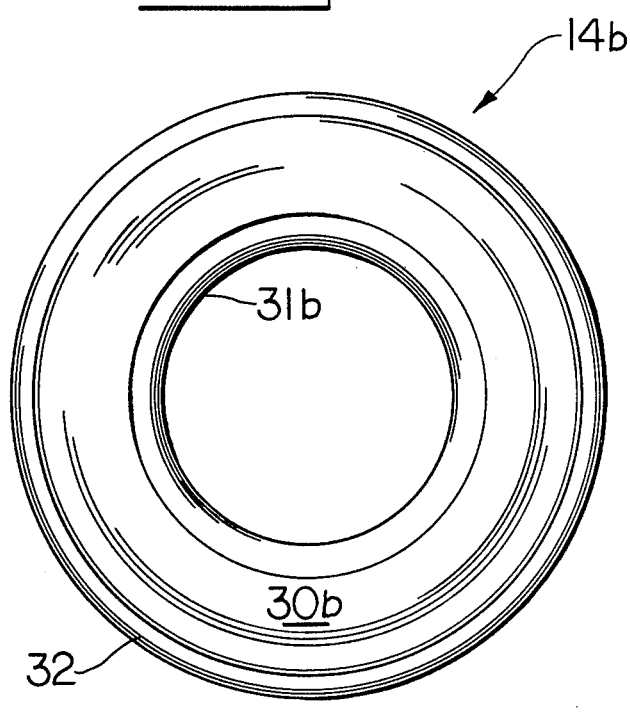

CARTRIDGE RETAINING MEANS FOR EARTHWORKING TIPS

BACKGROUND OF THE INVENTION

Hardened earthworking tips or teeth, such as those employed on rippers, scarifiers and loader buckets, must be held securely in place on a support member and yet be capable of expeditious removal for replacement purposes. Loss of the tip will subject the support member or adapter therefor to damage, thus requiring rather expensive and time consuming replacement thereof. Also, when a hardened tip is employed in conjunction with a rock crushing operation, for example, loss of the tip could cause severe damage to the rock crushing equipment should it become digested thereby.

Conventional retaining means for securing various work tools, such as hardened tips or teeth, in place on conventional earthworking equipment are exemplified by U.S. Pat. Nos. 2,965,365; 2,994,140; 3,274,908; and 3,264,827. The latter two patents are assigned to the assignee of this application.

SUMMARY OF THE INVENTION

An object of this invention is to provide an improved and economical cartridge retaining means for retaining a work tool on a support member and for permitting expeditious replacement thereof. A pin is disposed in aligning bores formed through the work tool and the support member and the cartridge retaining means circumvents the pin in frictional engagement therewith. The cartridge retaining means comprises a metallic housing having an annular elastomeric member secured therein and extending radially inwardly therefrom into frictional engagement with the pin.

BRIEF DESCRIPTION OF THE DRAWING

Other objects of this invention will become apparent from the following description and accompanying drawing wherein:

FIG. 3 is an enlarged cross-sectional view of the cartridge retaining means;

FIG. 4 is a view similar to FIG. 3, but illustrating a second cartridge retaining means embodiment of this invention;

FIG. 5 is a view similar to FIG. 3, but illustrating a third cartridge retaining means embodiment of this invention; and FIG. 6 is a front-elevational view of the FIG. 5 cartridge retaining means.

DETAILED DESCRIPTION OF THE PREFERRED EMBODIMENT

Figure 1:
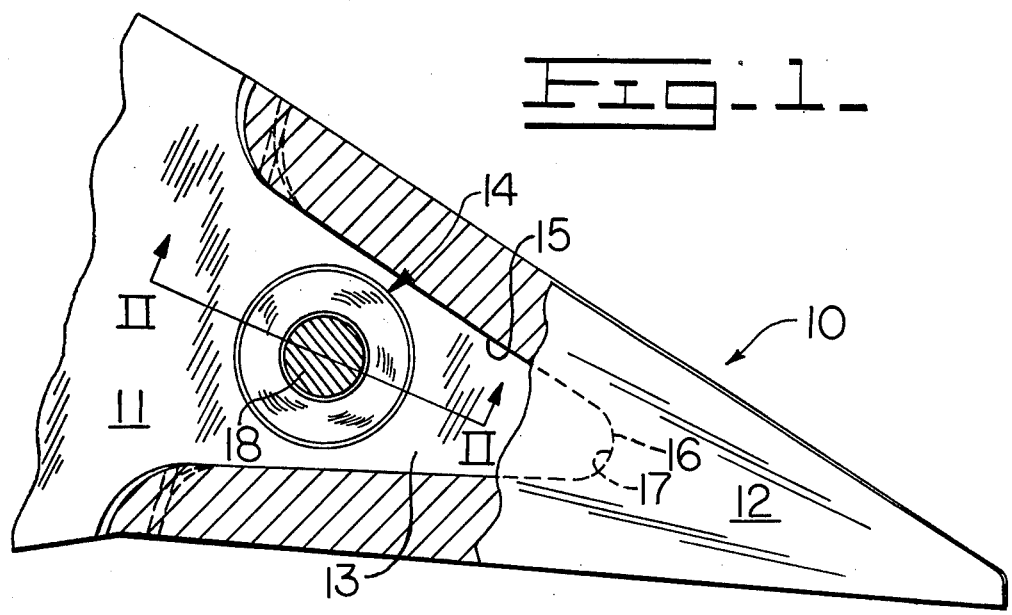
FIG. 1 is a partially sectioned, side-elevational view of an earthworking device comprising a work tool mounted on a support member by a first cartridge retaining means embodiment of this invention.

FIG. 1 illustrates an earthworking device 10 comprising a support member or adapter 11 having a work tool 12 detachably mounted on a forward end 13 thereof by a first cartridge retaining means embodiment 14 of this invention. The work tool may comprise a hardened earthworking tip or tooth mounted on a forwardly disposed cutting edge of a loader bucket. Other uses include the utilization of such tip on rippers or scarifiers, for example.

Forward end portion 13 of the support member is preferably wedge-shaped. A wedge-shaped recess 15 is formed in tip 12 to accommodate the like-shaped forward end portion of the support member. The support member preferably terminates at its apex or nose at a surface portion 16 adapted to at least partially abut a surface portion 17 formed at the apex of recess 15.

A cylindrical pin 18 is disposed in slip-fit relationship within a first bore 19 formed in the support member. A pair of laterally spaced second and third bores 20 and 21 are formed through the sidewalls of the tip to straddle the first bore in axial alignment therewith. Each of the latter two bores preferably have an inside diameter which is slightly larger than the outside diameter of the pin to prevent the imposition of shear loads on the pin during operation of the tip, i.e., such loads will be substantially absorbed at surface 16 of the support member.

Figure 2:
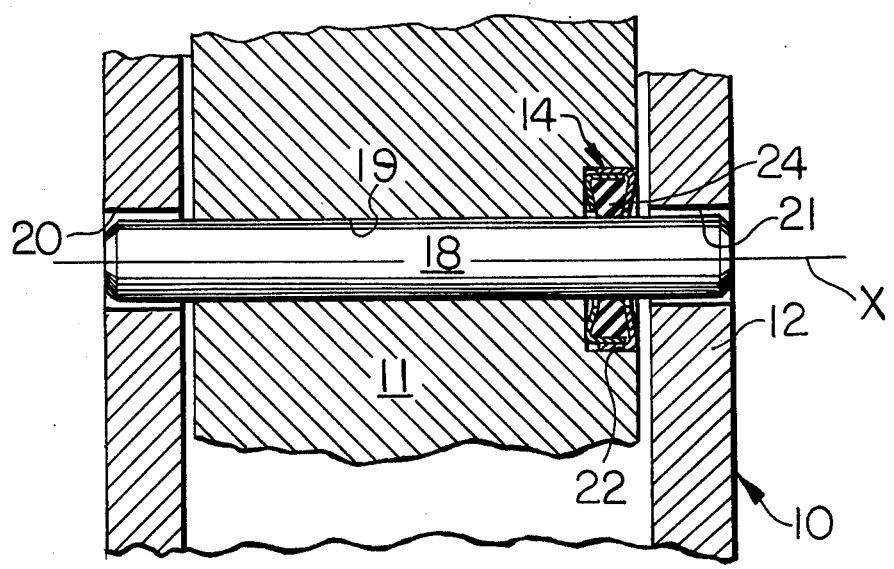
FIG. 2 is a sectional view thereof, taken in the direction of arrows II-II in FIG. 1.

Cartridge retaining means 14 is mounted in a counterbore 22 formed on one lateral side of support member 11 in concentric relationship with respect to bore 19. Referring to FIG. 3, the retaining means is disposed on a longitudinal axis X thereof and comprises a metallic housing 23 having an annular elastomeric member 24 disposed in an annular chamber defined therein and preferably bonded to the housing. It should be understood that two or more such cartridge retaining means may be utilized for work tool applications requiring greater retention capabilities, e.g., a second cartridge retaining means could be suitably disposed in a bore suitably formed on the left outboard side of the support member in FIG. 2.

The housing comprises a pair of suitably stamped cup-shaped first and second members 25 and 26 suitably stamped to comprise cylindrical out walls 27 and 28, respectively. Out wall 27 of the first member is disposed in telescopic relationship on outer wall 28 of the second member and press-fitted thereon and/or secured thereto by a suitable weld or the like. The first and second members further comprise a pair of frustoconically shaped sidewalls 29 and 30, respectively, extending radially inwardly towards the longitudinal axis of pin 18.

Elastomeric member 24 is preferably composed of a standard reinforced rubber material which is sufficiently resilient to be compressed into tight frictional engagement around the periphery of pin 18. In the FIG. 3 embodiment, sidewalls 29 and 30 of the telescoped members compress the elastomeric member therebetween to form a toroidal inner portion 31 which assumes a convex cross section in its compressed condition between members 25 and 26. Inner portion 31 has an inside diameter which is less than the outside diameter of the pin and flattens out slightly (FIG. 2) when compressed circumferentially about the pin.

Upon assembly, retaining means 14 is initially placed in counterbore 22 and tip 12 is then placed on forward end portion 13 of the support member. Pin 18 is then driven manually through aligned bores 19, 20 and 21, by means of a suitable punch and hammer, to expand inner portion 31 of the elastomeric member into compressed frictional engagement with the pin. The retention force provided by the elastomeric member can be suitably varied to meet a range of design specifications by varying the composition of the elastomeric member, varying the dimensional parameters thereof and/or varying the axial inward displacement of members 25 and 26 relative to each other. When it is desired to replace the tip, the pin may be driven in a like manner to release it from retaining means 14.

FIGS. 4 through 6 illustrate two alternative embodiments of this invention, adapted to be utilized in lieu of cartridge retaining means 14, wherein identical numerals depict corresponding constructions. However, numerals depicting modified constructions are accompanied by an "a" in FIG. 4 and by a "b" in FIGS. 5 and 6.

Cartridge retaining means 14a, illustrated in FIG. 4, comprises a metallic housing 23a having an annular elastomeric member 24a disposed in an annular chamber defined therein. The housing comprises a pair of suitably stamped cup-shaped first and second members 25a and 26a having cylindrical outer walls 27a and 28a, respectively. The outer walls are telescopically disposed in a manner similar to the corresponding outwalls of the FIG. 3 embodiment.

The first and second members further comprise a pair of parallel sidewalls 29a and 30a extending radially inwardly towards and perpendicular to a longitudinal axis X thereof. Elastomeric member 24a has a rectangular cross section terminating at an inner portion, extending radially inwardly from the inner walls, having a cylindrical inner surface 31 formed at its inner diameter. The elastomeric member is preferably bonded to the inner walls.

FIGS. 5 and 6 illustrate a third cartridge retaining means embodiment 14b comprising a metallic housing 23b having an annular elastomeric member 24b disposed in an annular chamber thereof. The housing comprises a pair of cup-shaped first and second members 25b and 26b having telescoped cylindrical outer walls 27b and 28b, respectively. Outer wall 27b has a crimped annular flange 32 formed on an outer end thereof which extends radially inwardly therefrom to overlap an outer portion of an inner sidewall 30b of the second member to lock the first and second members together axially.

Inner sidewall 29b of the first member extends radially inwardly towards a longitudinal axis X of the retaining means in perpendicular reltionship therewith whereas sidewall 30b is frustoconically shaped to diverge inwardly towards sidewall 29b. The elastomeric member is compressed axially between the sidewalls and may be bonded thereto if so desired. Such compression forms a toroidal inner portion 31b which normally assumes a convex cross section in its FIG. 5, relaxed condition and functions in its pin holding capabilities, similar to inner portion 31 of the FIG. 3 elastomeric member.

What is claimed is:

1. In an earthworking device comprising a support member, a work tool mounted on a forward end of said support member, a cylindrical pin having a generally smooth surface disposed in aligned bores formed through said support member and said work tool and retaining means to releasably hold said pin in said bore, the improvement wherein said retaining means comprises an annular cartridge including a housing defining an annular chamber therein and an annular elastomeric member disposed in said chamber to have an inner portion thereof extend radially inwardly therefrom into circumferential frictional engagement with said pin, said annular cartridge being mounted in a counterbore in a lateral side of said support member coaxially with said aligned bores, said housing comprising a pair of cupshaped first and second members each having an annular outer wall and a sidewall extending radially inwardly towards said pin, the outer wall of said first member being disposed in telescopic relationship on the outer wall of said second member.

2. The earthworking device of claim 1 wherein said tool constitutes a hardened earthworking tip.

3. The earthworking device of claim 1 wherein each of said outer walls is cylindrical.

4. The earthworking device of claim 1 wherein the sidewall of at least one of said first and second members is frustoconically shaped to converge axially inwardly into compressed relationship with said elastomeric member.

5. The earthworking device of claim 4 wherein the sidewall of each of said first and second members is frustoconically shaped and converge inwardly towards each other into compressed relationship with said elastomeric member on either side thereof.

6. The earthworking device of claim 4 wherein only the sidewall of one of said first and second members is frustoconically shaped.

7. The earthworking device of claim 1 wherein the sidewalls of said first and second members are parallel relative to each other.

8. The earthworking device of claim 1 further comprising an annular flange formed on an outer end of the outer wall of said first member to overlap a portion of the sidewall of said second member to lock said first and second members together axially.

9. The earthworking device of claim 1 wherein the inner portion of said elastomeric member is normally toroidal to assume a convex cross section in its relaxed condition when said retaining means is viewed in transverse cross section intersecting a longitudinal axis thereof.

10. The earthworking device of claim 1 wherein an inner surface of the inner portion of said elastomeric member is cylindrical.

11. The earthworking device of claim 1 wherein a forward end portion of said support member is wedge-shaped and wherein said work tool has a wedge-shaped recess formed therein and disposed in accommodating relationship on the wedge-shaped forward end portion of said support member, the apexes of each of the wedge-shaped forward portion of said support member and a wedge-shaped recess formed in said work tool abutting each other.

12. The earthworking device of claim 11 wherein said bores comprise a first bore formed through said support member and a pair of laterally spaced second and third bores disposed on either side of said first bore, each of said second and third bores having an inside diameter which is slightly larger than an outside diameter of said pin whereby forces imposed on said work tool are absorbed directly by said support member and not by said pin.

* * * * *